United States Patent [19]
Chou

[11] Patent Number: 5,945,789
[45] Date of Patent: Aug. 31, 1999

[54] TWO-WIRE DISPLAY LIGHTING CONTROL STRUCTURE

[76] Inventor: Tsung-Ming Chou, 1 Lane 328, Chung Hsin Road, Sec. 3, Chu-Tung Haian, Hsin Chu Hsien, Taiwan, 310

[21] Appl. No.: 09/087,898

[22] Filed: Jun. 1, 1998

[51] Int. Cl.$^6$ .................................................. H05B 37/02
[52] U.S. Cl. .......................... 315/324; 315/291; 315/316; 315/DIG. 5
[58] Field of Search .................................... 315/293, 294, 315/295, DIG. 5, 291, 287, 307, 133, 129, 130, 324, 316

[56] References Cited

U.S. PATENT DOCUMENTS

| | | | |
|---|---|---|---|
| 4,656,398 | 4/1987 | Michael et al. | 315/293 |
| 5,128,595 | 7/1992 | Hara | 315/312 |
| 5,420,482 | 5/1995 | Phares | 315/224 |
| 5,818,338 | 10/1998 | Ferraro | 315/129 |

*Primary Examiner*—Don Wong
*Assistant Examiner*—Wilson Lee
*Attorney, Agent, or Firm*—Dougherty & Troxell

[57] ABSTRACT

A two-wire display lighting control structure mainly including a main driver outputting pilot control signals and a plurality of sub-drivers each containing a signal discriminator and a load making circuit and each having a flood light or a light string serially connected thereto. A two-wire conductor is sufficient for use between the main driver and the sub-drivers to serially connect them. The pilot control signals output by the main driver replace first half-cycles of sine waves of an alternating current for supplying power needed by the sub-drivers and individually controlling series-parallel connected flood lights or light strings, so that the flood light or light string connected to a selected sub-driver lightens when it is supplied with power from another half-cycles of the sine waves of the alternating current.

5 Claims, 6 Drawing Sheets

TWO-WIRE DISPLAY LIGHTING CONTROL STRUCTURE

BACKGROUND OF THE INVENTION

The present invention relates to an improvement in display lighting control, and more particularly to a display lighting control structure in which only a two-wire conductor is needed to serially connect elements of the control structure to achieve individual control of the brightness or flicker of multiple flood lights or light strings.

Flood lights are widely used in department stores or general shops, show windows, special building scenes, stage backgrounds, etc. These flood lights usually have fixed luminance and brightness. Motors are associated with panel boards to control on, off, and flicker of these flood lights. High labor and material costs are needed to do so while only small changes in the on, off, and flicker of the lights can be achieved. It is also difficult to control the flood lights and flicker light strings to create sequential lighting effect, unless a big-scale lighting control system is used. In addition to the technical problems in controlling that can be possibly overcome, there are still basic wiring requirements of using multiple series-parallel connected conductors in controlling these flood lights and light strings. Such wiring is not only complicate but also expensive. It is therefore tried by the inventor to develop an improved display lighting control structure to eliminate the above-mentioned drawbacks.

SUMMARY OF THE INVENTION

A primary object of the present invention is to provide a display lighting control structure in which only a two-wire conductor is needed to individually control the on, off, and flicker of multiple flood lights or light strings.

Another object of the present invention is to provide a display lighting control structure in which discrimination by voltage is adopted to control multiple flood lights and light strings via a two-wire conductor.

To achieve the above and other objects of the present invention, there is provided a display lighting control structure including a main driver and multiple sub-drivers. Wherein, each of the sub-drivers has a flood light or a light string serially connected thereto; and a two-wire conductor is used between the main driver and the sub-drivers and between every two sub-drivers to serially connect them together. The main driver outputs different pilot control signals, such as different positive reference voltages, to replace the positive half-cycles of sine waves of the public electricity (alternating current). These pilot control signals combine with the negative half-cycles and are sent out. The sub-driver each has a signal discriminator capable of discriminating a matching control signal from others and then deciding whether the flood light or light string connected to the sub-driver is electrically made during the next negative half-cycle. That is, the flood lights or the light strings obtain their power supply completely from the negative half-cycles of the sine waves of a public electricity (alternating current). Thus, when the main driver outputs multiple adequate pilot control signals, it may control multiple sub-drivers to act, so that multiple sets of flood lights or light strings may be individually controlled to show different brightness or flicker patterns. The display lighting control structure of the present invention requires reduced manufacturing cost and allows more changes in the brightness and the flicker pattern of the display lighting or light strings.

BRIEF DESCRIPTION OF THE DRAWINGS

The structure, objects and functions of the present invention and the technical means adopted by it to achieve such objects and functions can be best understood by referring to the following detailed description of the preferred embodiments and the accompanying drawings, wherein.

DETAILED DESCRIPTION OF THE PREFERRED EMBODIMENTS

Figure 1:
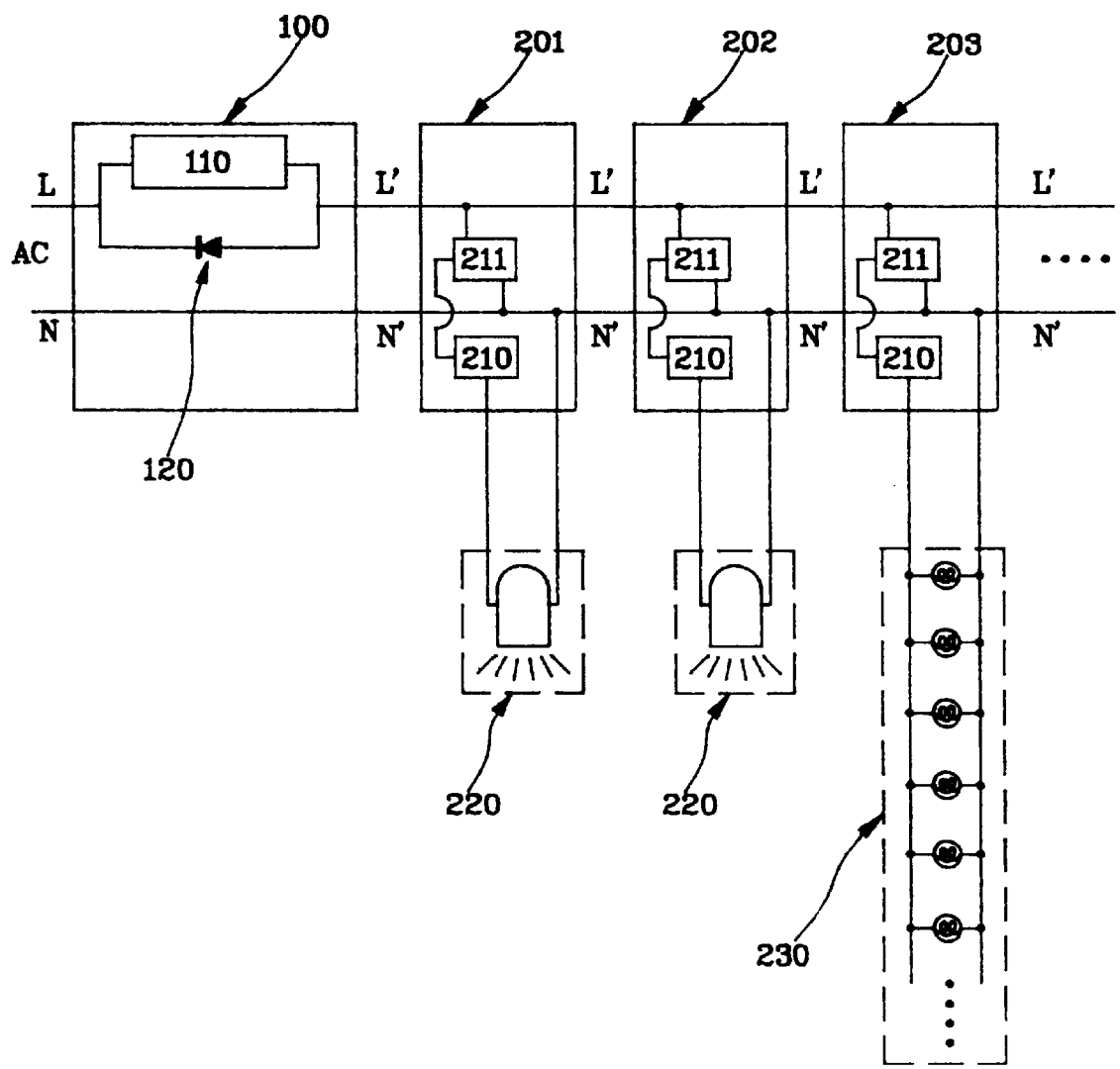
FIG. 1 is a schematic circuit diagram showing the wiring of the present invention.

Please refer to FIG. 1. The present invention mainly includes a main driver 100 and a plurality of sub-drivers 201, 202, 203 . . . , etc. Each of the sub-drivers 201, 202, 203 . . . , etc. has a flood light 220 or a light string 230 serially connected thereto.

The main driver 100 includes a rectifier 120 and a pilot signal generator 110. The rectifier 120 causes a public electricity half-wave rectified, and the other non-rectified half-cycles of the public electricity are used by the pilot signal generator 110 to generate different reference control signals. Wave forms of the rectified and the non-rectified half-cycles are then combined and output to the sub-drivers 201, 202, 203 . . . , etc. via two wires L' and N'.

Each of the sub-drivers 201, 202, 203 . . . , etc. includes a signal discriminator 211 and a load making circuit 210. The signal discriminator 211 may discriminate a reference control signal set for the particular sub-driver, so as to decide whether the load making circuit 210 is to be made during the next half cycle.

By this way, only two wires L' and N' are needed between the main driver 100 and the sub-drivers 201, 202, 203 . . . , etc. to send control signals for selecting adequate sub-drivers and to supply power to the flood lights 220 or light strings 230 connected to the sub-drivers. This not only simplifies the wiring between the main driver 100 and the sub-drivers 201, 202, 203 . . . , etc., but also allows the conventional flood lights 220 or light strings 230 to light in a changeful manner to create more beautiful scenes.

Figure 2:
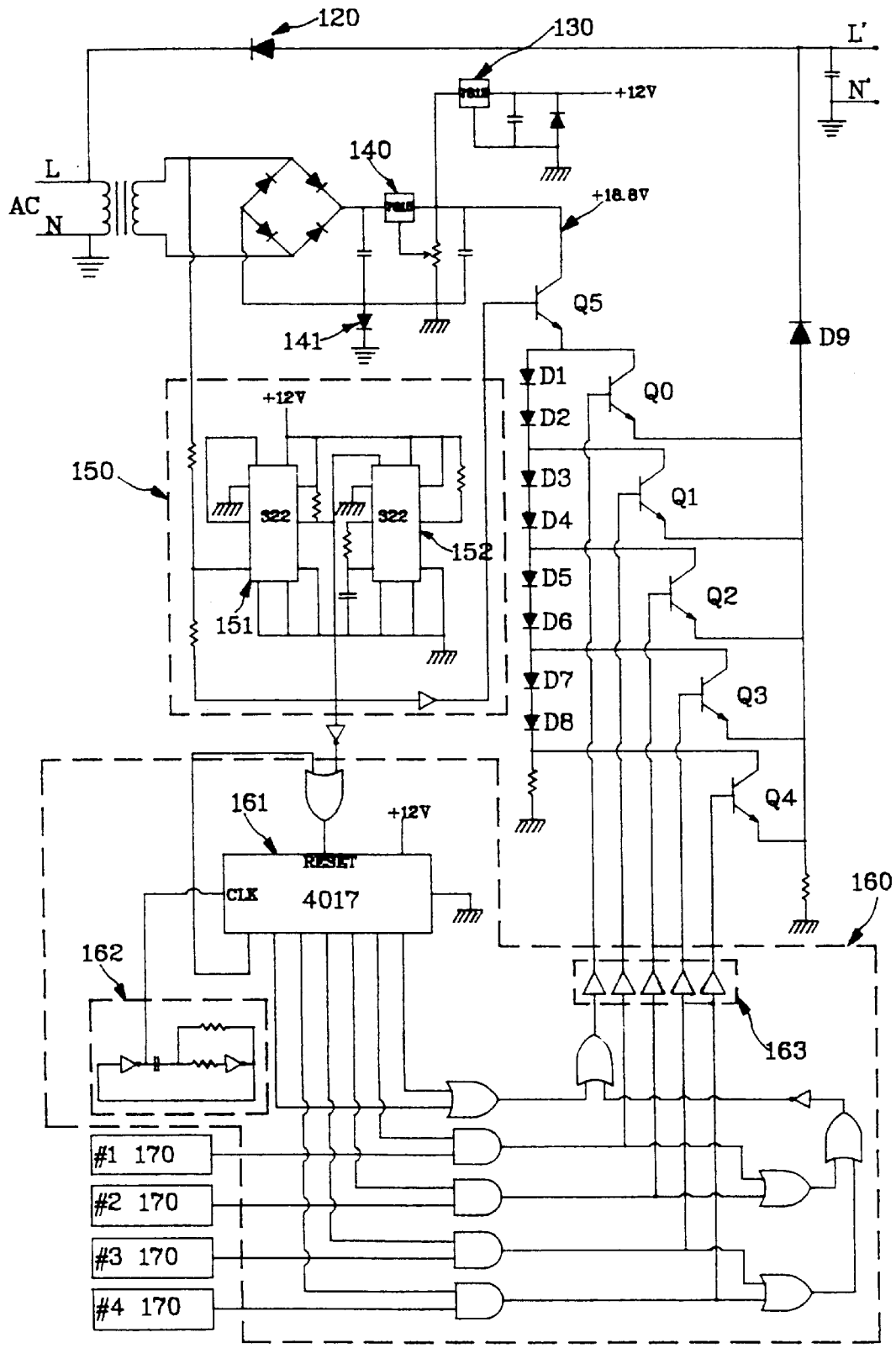
FIG. 2 is a circuit diagram of the main driver of the present invention.
Figure 3:
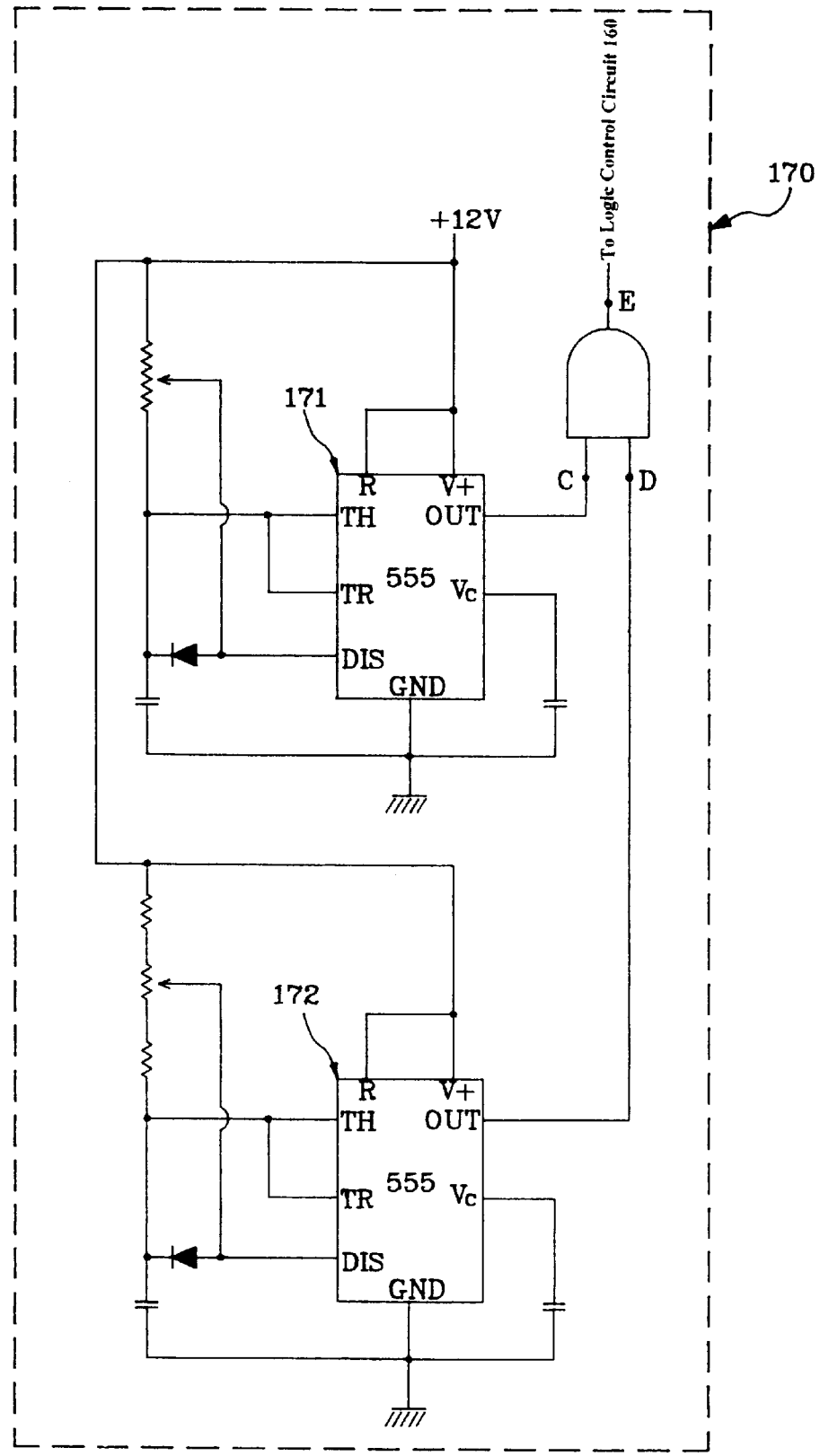
FIG. 3 is a logic circuit diagram showing the changes in the operation of the main driver of the present invention.

Please refer to FIGS. 2 and 3 in which detailed circuits are illustrated to describe the workability of the present invention. As shown, the illustrated circuits adopt a discriminating voltage method. There two reasons for adopting this method: 1) it requires only a low cost; and 2) it is simple to design and manufacture while a steady quality can be assured. However, it is understood that other suitable discrimination method, such as discriminating by frequency, phase, time delay, etc., can also be adopted. However, these other discriminating methods are not discussed in details herein.

In FIG. 2, the pilot signal generator 110 of the main driver 100 includes two triple-terminal power voltage stabilizers 130, 140 which respectively supply positive power required by electronic elements in the main driver 100 and by the pilot control signals. Wherein, all the circuits have a common base point though a forward diode 141 and an AC ground, so that any destruction of electronic elements in the main driver 100 by an inverse AC negative voltage can be prevented.

A zero-crossing detector circuit 150 consists of two IC-322's which are generally indicated by reference numerals 151 and 152. This circuit 150 controls the provision of a pilot control signal frame and the electrical making of a load power frame. These two frames are synchronous with half-cycles of the public electricity. That is, during the positive half-cycles of the public electricity, a transistor switch Q5 is made to allow a logic control circuit 160 to send out forward voltage of the pilot control signals via transistor switches Q0 to Q4.

The logic control circuit 160 consists of an IC-4017 counter 161, an oscillation circuit 162, and a logic driving circuit 163 to sequentially drive transistors Q0, Q1, Q2, Q3, Q4, Q0 to output pilot signals #0, #1, #2, #3, #4, and #0. The IC-4017 counter 161 follows signals from the zero-crossing detector circuit 150 to map out pilot signal sequences according to a frequency of the oscillation circuit 162 during the pilot signal frame. Then, with a plurality of change logic circuits #1 to #4 which are generally indicated by reference numeral 170, logic changes in these pilot signal sequences are made to drive individual transistors Q0, Q1, Q2, Q3, Q4 via the driving circuit 163, so that these transistors send out discriminating voltages set for each particular sub-driver.

A change logic circuit 170 is shown in FIG. 3. Since the present invention is based on a control of the electrical making during the whole negative half-cycle, the brightness of a light can not be controlled by the degree of phase angles. Instead, in the present invention, the brightness of the display lighting or light strings is controlled by time ratio. More specifically, a very small ratio of a light-ON time to a light-OFF time shall make the on and off of the display lighting or light strings not perceptible by human eyes (for human eyes, a transient after image for about $\frac{1}{16}$ second exists). There are four change logic circuits 170 separately marked #1, #2, #3, and #4 for controlling four different types of individual changes, that is, different brightness and flicker time periods of the display lighting or light strings. Wherein, each change logic circuit 170 consists of two IC-555's. One of the IC-555's is a brightness control circuit 171 for controlling the times of electrically making the whole negative half-cycles within a very short time, for instance, within $\frac{1}{10}$ second. It is not necessary to precisely indicate what the very short time is. However, the more times the whole negative half-cycles are electrically made within that very short time, the brighter the display lighting or light strings are. Another IC-555 forms an action cycle control circuit 172 for controlling the ratio of an ON cycle to an OFF cycle of an individual lighting mode within a prolonged time, for instance, within 180 seconds. It is also not necessary to precisely indicate what the prolonged time is. However, the higher the ON/OFF ratio is, the longer the display lighting or light strings are on.

Figure 4:
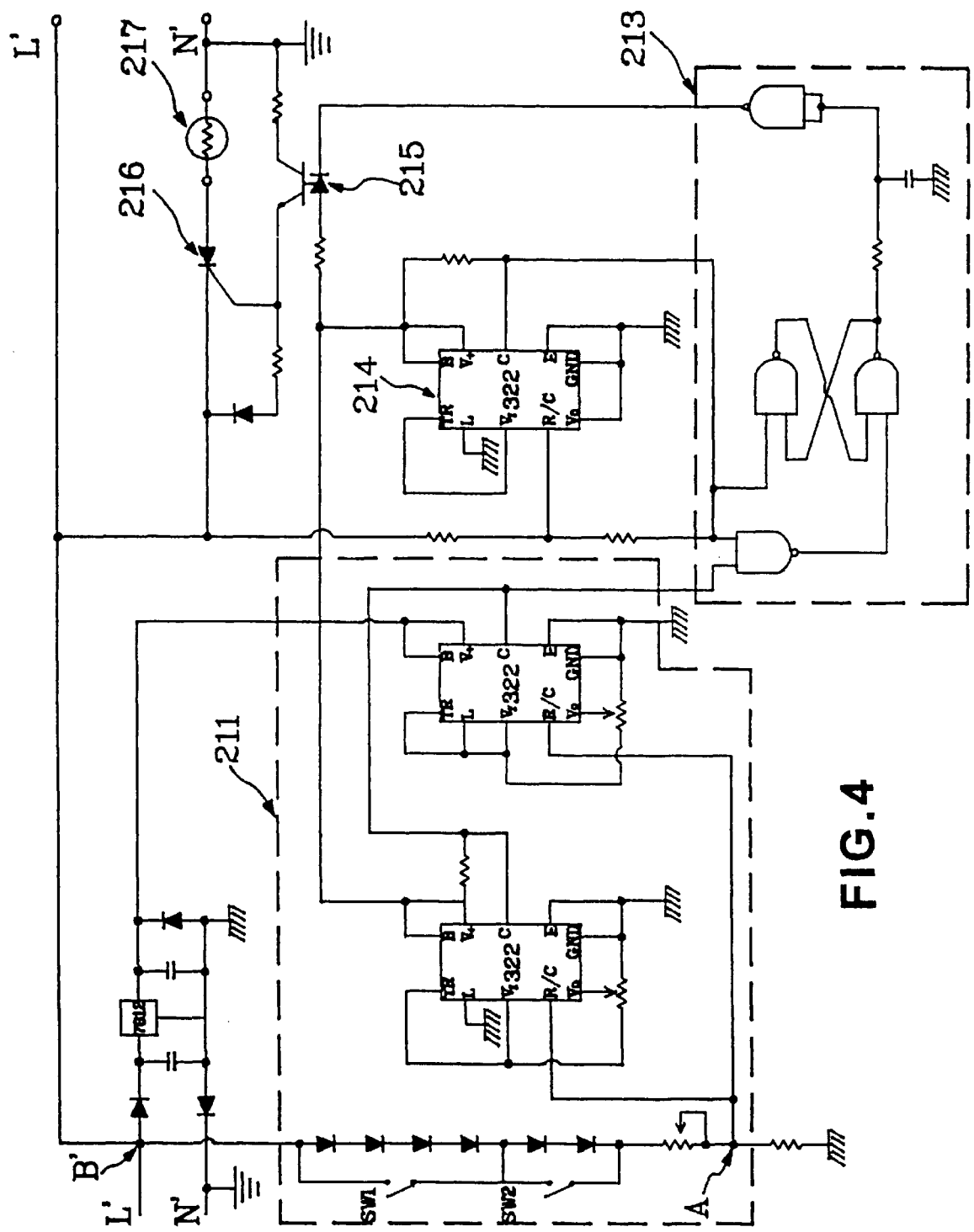
FIG. 4 is a circuit diagram of the sub-driver of the present invention.

Please now refer to FIG. 4 in which the structure of one sub-driver 201 is shown. The signal discriminator 211 of the sub-driver 201 consists of two IC-322's and several serially connected diodes and switches SW1, SW2. The load making circuit 210 consists of an IC-322 zero-crossing detector circuit 214, a gate circuit 213, and an SCR 216 triggered to electrically make by an optical coupling crystal 215. Following is a table based on the output of the main driver 100 and the circuit of the sub-driver 201 for showing the relation among the voltage at point A, the ON/OFF of the switches SW1, SW2, and the discriminating voltage for each sub-driver (Voltage at Point A is designed to be $\frac{1}{5}$ of that at Point B):

| Voltage (V) At Point A | Voltage #0 | Voltage #1 | Voltage #2 | Voltage #3 | Voltage #4 |
| --- | --- | --- | --- | --- | --- |
| SW1:ON SW2:ON | 3.24 | 2.98 | 2.72 | 2.46 | 2.20 |
| SW1:ON SW2:OFF | 2.98 | 2.72 | 2.46 | 2.20 | 1.94 |
| SW1:OFF SW2:ON | 2.72 | 2.46 | 2.20 | 1.94 | 1.68 |
| SW1:OFF SW2:OFF | 2.46 | 2.20 | 1.94 | 1.68 | 1.42 |

From the above table, it can be seen that when a voltage of 2.20V is used as a reference discriminating voltage, the ON/OFF of the switches SW1, SW2 can be used to determine which type of the sub-dividers 201, 202, 203 . . . , etc. is selected. In other words, the two IC-322's of the signal discriminator 211 are voltage high and low limits discriminators, and they consider any voltage within the range from 2.10V to 2.30V as an action allowed signal (that is, a standard voltage of 2.20V with an error factor is considered). The gate circuit 213 keeps this action allowed signal and cooperates with the zero-crossing detector circuit 214 to allow the optical coupling crystal 215 to drive the power element SCR 216 to an ON state before the negative half cycle begins, so that the load flood light 220 or the light string 230 may act immediately after the negative half cycle begins. And, when the negative half cycle begins, the zero-crossing detector circuit 214 will reset the gate circuit 213. Since the power element SCR 216 works only in the negative half cycle and since the gate circuit 213 is reset, the SCR automatically becomes OFF when the next positive half cycle begins. The ON and OFF cycles circulate alternately to control the actions of the flood lights or the light strings.

Figure 5:
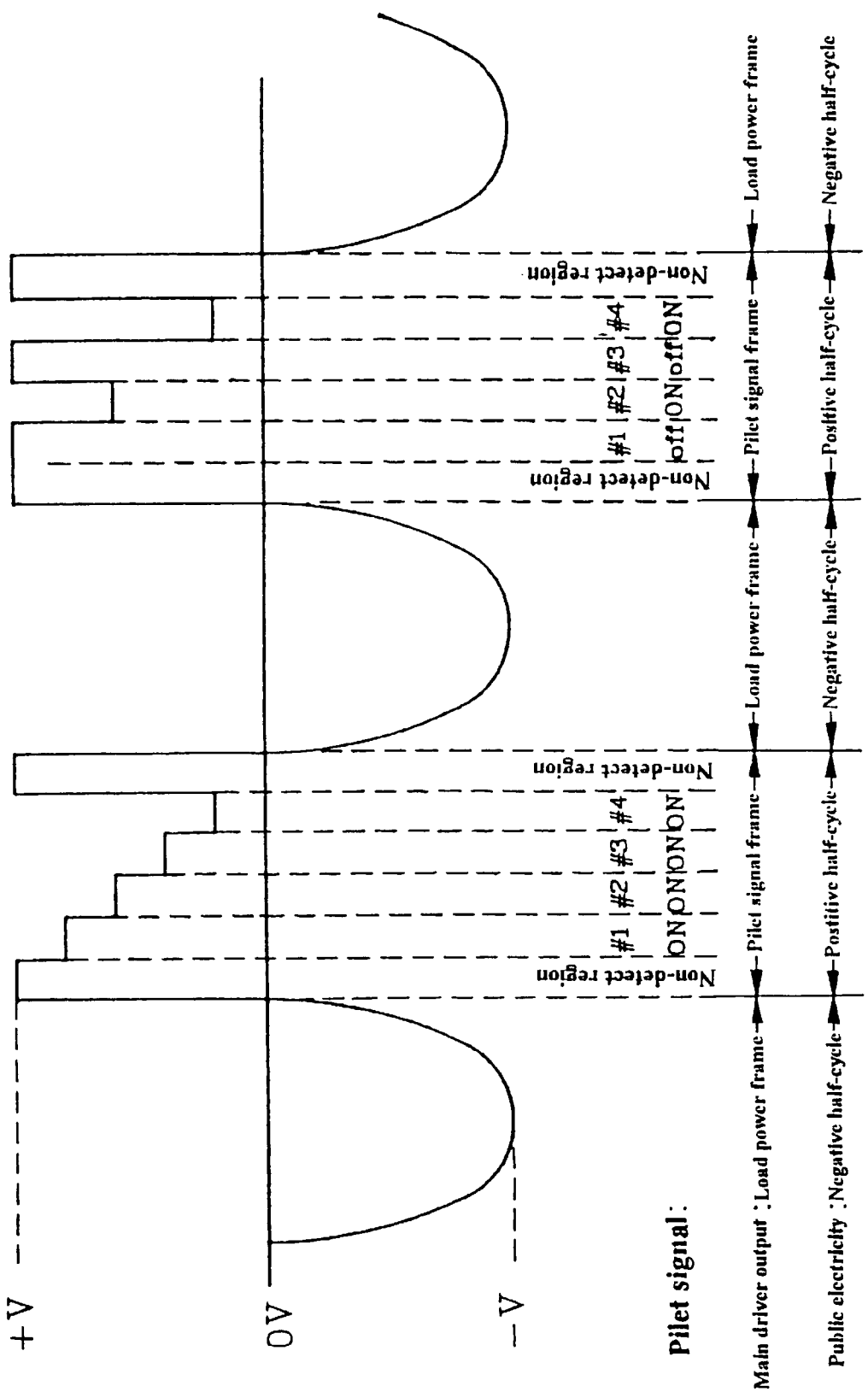
FIG. 5 shows the wave form of the main driver output of the present invention.

Please refer to FIG. 5. Since the control signal is output by the pilot signal generator 110 of the main driver 100 of the present invention during the half-cycle which has been filtered by the rectifier 120, a combination of the rectified and the non-rectified half-cycles will not cause any overlap. And, the combined two half-cycles is similar to the public electricity and can therefore be transmitted by two wires L' and N'. Moreover, the present invention adopts reference voltage discriminating method and utilizes positive half-cycle frames of sine waves of the public electricity for the main driver 100 to control the sub-drivers 201, 202, 203 . . . , etc. and supply positive power to the sub-drivers 201, etc., so that control elements of the sub-drivers 201, etc. are supplied with basic power. Wherein, the main driver 100 outputs in a predetermined sequence. The first and the last outputs are non-detect regions #0, they are also the basic power supplied to the sub-drivers 201, 202, 203 . . . , etc. by the main driver 100. Between these two non-detect regions #0, signal frames #1, #2, #3, and #4 are sequentially arranged. If actuation of any specific type of the sub-driver 201, 202 or 203 is desired, that is, to allow the load connected to the specific sub-driver to be electrically made in the next negative half-cycle, the main driver 100 shall, in the signal frames of the pilot signal frame set for the particular sub-driver, output the discriminating voltage set for that sub-driver. Otherwise, the main drive 100 shall output basic power required by the sub-driver 201, etc., as shown in the non-detect regions #0. At this point, the sub-drivers 201, etc. do not act. From the two different pilot signal frames in FIG. 5, the difference between them can be easily understood. Since the sub-drivers 201, etc. have their own signal discriminator 211 and load making circuit 210, when they are electrically connected to the main driver 100, they shall intercept only the control signal of their own type to lighten the flood lights 220. Whereby, so long as the rectifier 120 has a sufficient power value, the voltage and power used by the load of flood light 220 of the sub-driver will not affect the two wires L' and N'. Thus, the sub-drivers 201, 202, 203 . . . , etc. can be series-parallel connected. The numbers of sub-drivers 201, etc., that is, the total load of the sub-drivers, completely depends on the power of the rectifier 100. However, a high power rectifier 100 is cheap in price and is advantageous to the manufacture of the present invention.

Figure 6:
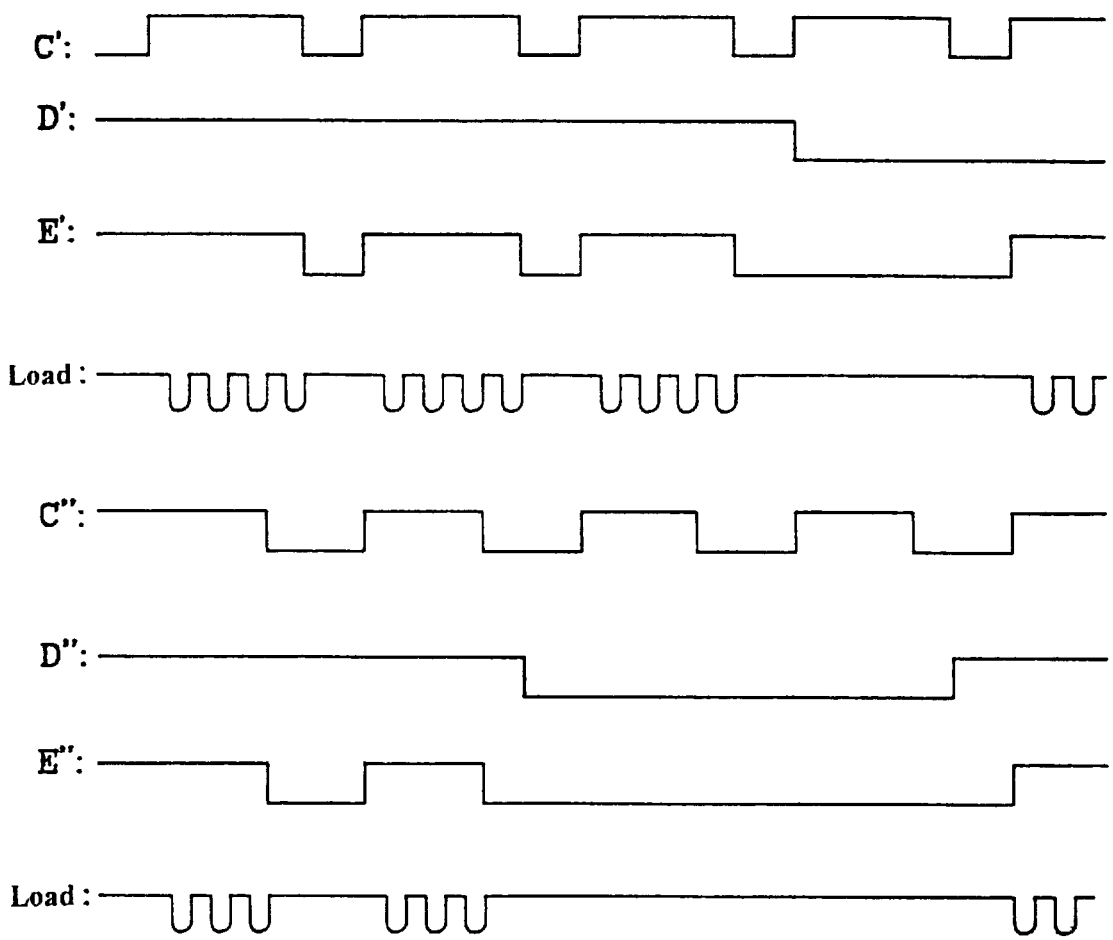
FIG. 6 shows the brightness and ON/OFF cycle control of the present invention.

This proves that the above described control manner is actually workable. The only matter to be considered is the power is supplied to the flood lights 220 or the light strings 230 only in the non-rectified negative half-cycles, and therefore, the lights or light strings shall have decreased luminance. However, this can be easily solved by increasing the wattage of bulbs for the display lighting or the light strings. As to the brightness and the ON/OFF cycles, they can be controlled by setting desired times of electrical making of the loads. As shown in an upper part of FIG. 6, when the electrical making time sequences of C' and D' are properly increased, a brightness of 80% (C') and an ON/OFF ratio of 75% (D') can be achieved. And, as shown in a lower part of FIG. 6, when the electrical making time sequence of C" is properly decreased, a brightness of 60% (C") and an ON/OFF ratio of 50% (D") can be achieved. Thus, the ON/OFF of a display lighting or light string is changeful and can be easily controlled.

According to the above description, the times of ON/OFF are controlled at a rate of 60 times/second (while the public electricity has a frequency of 60 Hz). That is, the main driver 100 controls the sub-drivers 201, 202, 203 . . . , etc. in a manner which allows very minor changes in the ON/OFF of the loads of the sub-drivers. And, the load power supply is always made at zero potential and will not cause any electromagnetic interference.

Following are some other advantages of the present invention:

1. Easy installation: The present invention includes a main driver and a plurality of sub-drivers. Two wires are used between the main driver and the sub-drivers or between the sub-drivers themselves to serially connect them. A common extension cord may also be used between every two drivers to connect them together without affecting the control by the main driver over the sub-drivers. The installation of the present invention is very convenient.

2. Uniform specification: All the sub-drivers can have uniform specification. Each sub-driver may select one of the four signal frames #1 to #4. The same type of signal frame may be selected for different sub-drivers, so long as the power required is within the rated current supplied by the main driver. The numbers of sub-drivers may be decided depending on the actual need and multiple sub-drivers may be directly serially connected for use. This uniform specification allows low manufacturing cost and convenient use by consumers.

3. Lower cost: The present invention includes a main driver and multiple sub-drivers. The sub-drivers control the loads serially connected thereto and the main driver supplies the negative half-cycles of the sine waves of the public electricity required by all the sub-drivers. To fulfill this function, only a simple and non-expensive high power diode is required.

4. Changeful control manners: In the present invention, a discriminating control signal is sent in each positive half-cycle of the sine waves of the public electricity, so that each sub-driver controls a next negative half-cycle of the sine waves of the public electricity to decide whether that negative half-cycle is electrically made for the load (the flood light or the light string) associated with the sub-driver. For the public electricity of 60 Hz, up to 60 times of control in one second can be made. So, it is very easy to control the brightness or flicker of each individual lamp or light string with the present invention.

According to the above description, the present invention allows individual lamps or light strings to flicker or to shine in different intensity, so as to highlight the objects being shone by the flood lights or beautify the lighting in a background. When three flood lights separately projecting a primary color, that is, red, blue or green color, project their light on the same spot, changes in brightness of these individual flood lights can be achieved by controlling three sub-drivers via the main driver. That is, the color shown on the projected spot can be freely changed under control.

The present invention has simplified structure which includes uniform parts to facilitate convenient installation and low manufacturing cost while allows lamps or light strings to create changeful vision effects via their different brightness and ON/OFF cycles.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A two-wire display lighting control structure, comprising a main driver and a plurality of sub-rivers, each of said sub-drivers having a light device serially connected thereto;

said main driver including a rectifier and a pilot signal generator, said rectifier causing first half-cycles of a public electricity to be half-wave rectified while said pilot signal generator uses second half-cycles of said public electricity to generate different reference control signals, and wave forms of said first rectified half-cycle and said second half-cycle being finally combined and sent to one of said sub-drivers; and said plurality of sub-drivers each including a signal discriminator and a load making circuit, said signal discriminator of each different sub-driver discriminating from said different reference control signals generated by said pilot signal generator of said main driver a discriminated reference control signal specific to said sub-driver and using said discriminated reference control signal to decide whether said load making circuit is to be electrically made during said second half-cycles of said public electricity;

whereby simply a two-wire conductor is needed between said main driver and said sub-drivers and between every two of said sub-drivers to transmit signals, and whereby said main driver outputs a variety of pilot control signals to replace said first half-cycles of said public electricity to select a desired sub-driver from said a plurality of sub-drivers and supplies power during said second half-cycles of said public electricity to said light device connected to said selected sub-driver to turn on said light device.

2. The two-wire display lighting control structure as claimed in claim 1, wherein said control signals generated by said pilot signal generator comprise one of a phase discriminating signal, a time delay frequency discriminating signal, and a voltage discriminating signal.

3. The two-wire display lighting control structure as claimed in claim 1, wherein said pilot signal generator of said main driver further includes a power voltage stabilizer for supplying power required by electronic elements of said main driver, a zero-crossing detector circuit consisting of two IC-322's for providing a pilot control signal frame an a reference value of electrically making said load making circuit, a logic control circuit consisting of an IC-4017 counter, an oscillation circuit, and a logic driving circuit for sequentially driving a transistor to output said pilot signals, and a plurality of change logic circuits each of which consists of two IC-555's for controlling an ON/OFF cycle of light devices connected to said sub-drivers and the brightness of said light devices, and wherein said signal discriminator of each of said sub-drivers includes two IC-322's and a plurality of serially connected diodes and switches, and said load making circuit of each of said sub-drivers includes an IC-322 zero-crossing detector circuit, a gate circuit, and an SCR which can be triggered by an optical coupling crystal.

4. The two-wire display lighting control structure as claimed in claim 1 wherein at least one of said light devices comprises a flood light.

5. The two-wire display lighting control structure as claimed in claim 1 wherein at least one of said light devices comprises a light string.

\* \* \* \* \*